United States Patent [19]
Bamberg et al.

[11] Patent Number: 5,534,308
[45] Date of Patent: Jul. 9, 1996

[54] CERAMIC, HEAT INSULATION LAYER ON METAL STRUCTURAL PART AND PROCESS FOR ITS MANUFACTURE

[75] Inventors: Joachim Bamberg, Dachau; Ludwig Steinhauser, Maisach; Erwin Bayer; Peter Adam, both of Dachau, all of Germany

[73] Assignee: MTU Motoren-Und Turbinen-Union München GmbH, München, Germany

[21] Appl. No.: 439,277

[22] Filed: May 11, 1995

Related U.S. Application Data

[62] Division of Ser. No. 191,273, Feb. 3, 1994.

[30] Foreign Application Priority Data

Feb. 4, 1993 [DE] Germany .......................... 43 03 135.8

[51] Int. Cl.$^6$ .................... B05D 1/08; B05D 3/02
[52] U.S. Cl. ................... 427/454; 427/190; 427/205; 427/376.4; 427/376.6; 427/419.2; 427/419.3; 427/455; 427/576; 428/325; 428/457; 428/476; 428/702; 428/704
[58] Field of Search ................... 427/454, 455, 427/576, 190, 205, 419.2, 419.3, 376.4, 376.6; 428/457, 325, 472, 702, 704

[56] References Cited

U.S. PATENT DOCUMENTS

| | | | |
|---|---|---|---|
| 4,058,485 | 11/1977 | Cheung | 428/550 |
| 4,645,716 | 2/1987 | Harrington | 428/472 |
| 4,822,689 | 4/1989 | Fukubayashi et al. | 75/252 X |
| 4,902,576 | 2/1990 | Shimura | 428/472 |
| 4,996,117 | 2/1991 | Chu | 428/472 |
| 5,043,182 | 8/1991 | Schultze et al. | 427/454 |
| 5,173,354 | 12/1992 | Raj | 428/469 |
| 5,180,285 | 1/1993 | Lau | 428/472 |
| 5,279,904 | 1/1994 | Grandin de l'Eprevier | 428/319 |
| 5,288,205 | 2/1994 | Jones | 228/469 |
| 5,302,465 | 4/1994 | Miller | 428/552 |
| 5,308,399 | 5/1994 | Pillhoefer | 428/707 |
| 5,320,909 | 6/1994 | Scharman | 428/708 |
| 5,334,462 | 8/1994 | Vine | 428/701 |
| 5,352,340 | 10/1994 | Schienle | 428/469 |
| 5,403,669 | 4/1995 | Gupta | 428/552 |

FOREIGN PATENT DOCUMENTS

| | | | |
|---|---|---|---|
| 0075228 | 3/1983 | European Pat. Off. | |
| 75228 | 3/1983 | Japan | 427/454 |

*Primary Examiner*—Michael Lusignan
*Attorney, Agent, or Firm*—Ladas & Parry

[57] ABSTRACT

A ceramic heat insulation layer applied to a metal structural part or to an intermediate adherent layer thereon, has the surfaces of its inner, open pore structure coated with a passivating ceramic material or a metal deposition material for improving the properties of the heat insulation layer.

10 Claims, No Drawings

CERAMIC, HEAT INSULATION LAYER ON METAL STRUCTURAL PART AND PROCESS FOR ITS MANUFACTURE

This is a divisional of copending application(s) Ser. No. 08/191,273 filed on Feb. 3, 1994.

FIELD OF THE INVENTION

The invention relates to heat insulation, ceramic layers applied to metal structural parts and particularly to improvements relating to the open, inner structure of the ceramic layers.

The invention further relates to processes of producing the improved, heat insulation, ceramic layers on the metal structural parts.

BACKGROUND AND PRIOR ART

It is known to provide a metal structural part with a lining or layer of ceramic material for protection of the metal part against high temperatures and corrosion by hot gases. These layers are applied by means of plasma spraying or vaporization. In this way, the ceramic layers are formed with an open, inner structure having large, open pores or cavities constituting an open grain structure. The open, inner structure is formed either in the course of manufacture or intentionally. The open structure is formed at least in part, by microcracks in the ceramic layer. Chemical and physical changes can occur at the surfaces of the open, inner pores due to thermal loads and hot gases, and these may lead to the formation of additional microcracks in the protective ceramic layer. The progression of cracking can ultimately lead to a complete breakdown of the heat insulation layer.

Another disadvantage of the ceramic, heat insulation layers with open, inner pore surfaces is that they cannot effectively protect the structural part against oxidation.

SUMMARY OF THE INVENTION

An object of the invention is to provide a ceramic, heat insulation layer of the above type, in which the formation of additional microcracks and the progression of cracking is prevented, and the structural part, or any metal adherent layers between the heat insulation layer and the metal structural part, are better protected against oxidation.

The object is achieved by forming a coating on the open, inner pore surfaces of the heat insulation, ceramic layer of a material selected from the group consisting of a passivating ceramic material or a deposition metal for improving the properties of the heat insulation layer.

The resistance to corrosion, oxidation, and thermal shock as well as the tensile strength of the composite of the metal structural part and the heat insulation layer are advantageously increased by means of this coating material. Corrosion, separation, and sintering processes are essentially stopped in the microcracks, interfaces and pores in the heat insulation layer by the improvement of the invention, and thus further formation of microcracks during operation of the metal structural part are avoided, so that the service life of the structural part with the heat insulation layer is improved overall.

In a preferred embodiment of the invention, the passivating ceramic material added to the ceramic, heat insulation layer consists of cerium oxide or stabilized zirconium dioxide. These substances are applied as nanocrystalline particles in a liquid to the open inner surfaces of the heat insulation layer and deposited as a ceramic coating on the inner surfaces when the liquid is evaporated. The cerium oxide is introduced in the form of a dispersion into the microcracks, interfaces and pores by means of capillary forces. After the carrier liquid has been removed, the open, inner surfaces of the heat insulation layer are coated with a passivating cerium oxide layer. This advantageously prevents, among other things, damage of the heat insulation layer by aggressive hot gases.

Metals deposited in the interfaces, open pores and microcracks primarily include Ni, Co, Cr, Al, Pt, Au or mixtures thereof. The surfaces are advantageously passivated by these metal deposits and are protected against undesired chemical and physical effects, particularly against oxidation.

The metals are preferably deposited from solutions of metals of organic or aqueous base by thermal decomposition or electrolysis. Preferred metal solutions are platinum solutions, from which oxidation-resistant coatings are advantageously deposited. The metal deposition on the inner surfaces thus has the advantage that the completeness of the coating of the inner surfaces of the heat insulation layer can be rapidly tested without disturbance by means of eddy current measurement. In electrolytic deposition, metallizing can be achieved, preferably only in the region of the adhering surface, by selecting the parameters of current density and duration of electrolysis.

A preferred application of the heat insulation layer is as a protective layer for drive components in a hot-gas channel, preferably for the coating of turbine blades and annular shroud segments thereof. This use offers the advantage that the resistance to corrosion, oxidation, and thermal shock of the coated drive components is increased.

Another preferred application of the heat insulation layer consists of the protection of engine components, such as pistons or valves, which are subject to increased heat cycle loads.

A process for the production of the heat insulation layer comprises the following steps: after optional application of an intermediate metal layer on the metal structural part, a material containing zirconium dioxide is sprayed onto the metal structural part as a heat insulation layer; then the heat insulation layer is impregnated with a liquid containing a substance selected from the group consisting of a passivating ceramic material in the form of nanocrystalline particles and a metal, preferably selected from organometallic compounds. Then, the structural part with the heat insulation layer thereon is heat treated.

This process has the advantage that an improvement in the heat insulation layer can be obtained subsequent to the formation of the heat insulation layer on the structural part by cost-favorable means.

For coating the inner pore surfaces of the heat insulation layer with ceramics, the heat insulation layer is preferably impregnated with a dispersion of nanocrystalline cerium oxide or nanocrystalline stabilized zirconium dioxide. The nanocrystallinity of the ceramic particles contained in the dispersion advantageously assures a complete and uniform coating of the inner surfaces of the heat insulation layer with ceramics, after vaporizing the liquid phase of the dispersion and heat treating the structural part with the heat insulation layer.

For coating the inner pore surfaces of the heat insulation layer with metals, the heat insulation layer is preferably impregnated with a metal salt in an aqueous or organic solution. In particular, for the deposition of platinum, organoplatinum compounds have been advantageously used for the impregnation.

Another preferred embodiment of the process consists of the deposition of the metal by means of electrolysis by cathodic reduction of the metal.

The location of the deposition in the heat insulation layer is preferably controlled by the duration of electrolysis, so that a metal deposition can be obtained preferably in the region of the heat insulation layer that is close to the surface of the structural part (or adhering intermediate layer), which has special advantages when platinum is used, since the structural part or the adhering intermediate layer endangered by oxidation is protected from oxidation by the platinum.

The effect of the process is greater, the more complete and/or rapid the coating of the inner pore surfaces. Thus, substances with small surface tension are preferred, such as microcrystalline dispersions or solutions.

DETAILED DESCRIPTION

The invention will be described hereafter in greater detail with reference to the following Examples representing preferred embodiments of the invention.

EXAMPLE 1

After applying a metal adhering layer of MCrAlY on a metal structural part of a nickel alloy by plasma spraying, a zirconium dioxide layer, stabilized with yttrium oxide, is sprayed onto the layer on the structural part to a thickness of 0.4 mm to produce a heat insulation layer on the metal adhering layer. Then the heat insulation layer is impregnated for 20 hours with a dispersion of an organic solvent containing nanocrystalline cerium oxide powder. The average grain size of the powder is 200 nanometers. 200 g of cerium oxide powder were dispersed in a liter of solvent for production of the dispersion. Then the structural part with the impregnated heat insulation layer is heated for 10 minutes to 500° C. Thereby, the solvent is vaporized and the cerium oxide covers the inner pore surfaces of the heat insulation layer. Heat insulation layers improved in this way show 10 times higher resistance to fluctuating heat loads in comparison to untreated heat insulation layers.

EXAMPLE 2

In this example, instead of impregnation with cerium oxide as in Example 1, the heat insulation layer is impregnated with a water-based platinum solution of platinum diamine dinitrite (10g/l) for 20 hours. After drying in air, the structural part was heated to 500° C., whereby the platinum complex decomposes, and the inner surfaces of the open pores and microcracks are coated with pure platinum. The structural part treated in this way was subjected to tests for heat load fluctuation. It was determined that the platinized heat insulation layer has an essentially higher resistance to fluctuations of heat load compared to non-platinized, heat insulation layers by a factor greater than 20. It was further determined that temperature conductance was not measurably increased. The completeness of the infiltration of the heat insulation layer with platinum was tested by metallographic means. A similar result was obtained with platinum solutions based on an organic solvent.

EXAMPLE 3

In this Example, as in Example 2, a zirconium dioxide layer stabilized with yttrium oxide is applied onto the metal adhering layer on the structural part by means of plasma spraying. Then the coated structural part is immersed in a 1.5 molar copper sulfate solution and connected as the cathode in an electrolysis operation at a current density of 0.1 A/cm for 20 minutes.

In this way, a coating of the surfaces of the pores and microcracks is obtained for the entire region of the heat insulation layer. With correspondingly shorter electrolysis times, the metal deposits only in the region near the metal adhering layer.

Other metals, including Ni, Co, Cr, Al, Au and platinum can be cathodically deposited by the use of appropriate electrolytes (for platinum, e.g., platinum P salt). In this way it can advantageously be obtained that the metal adhering layer is protected against oxidation without essentially changing the material characteristics of the heat insulation layer.

EXAMPLE 4

In this Example, as in Example 2, a zirconium dioxide layer stabilized with yttrium oxide is applied to the metal adhering layer on the structural part. The zirconium dioxide layer is applied to a thickness of 0.2mm by a PVD technique. Then the heat insulation layer is impregnated with an aqueous platinum solution comprised of hexachloroplatinum (IV) acid for a period of 8 hours. After drying in air, the coated structural part is heated to 500° C., whereby the hexachloroplatinum (IV) acid is decomposed and the surfaces of the pores and microcracks in the heat insulation layer are coated with platinum. Heat insulation layers improved in this way show a clearly higher resistance to fluctuations in heat load of a magnitude greater than 300%.

Although the invention has been described in relation to specific examples thereof, it will become apparent to those skilled in the art that numerous modifications and variations can be made within the scope and spirit of the invention as defined in the attached claims.

What is claimed is:

1. A process for producing a heat insulation, ceramic layer on a metal structural part, comprising:

depositing a material containing zirconium oxide onto a metal structural part to form a heat insulation layer on said metal part, said heat insulation layer having an open, inner structure, and impregnating said heat insulation layer with a liquid containing a passivating agent of ceramic nanocrystalline particles to form a passivating coating of said ceramic particle on surfaces of said open, inner structure of said heat insulation layer, and wherein said ceramic particles of said passivating coating infiltrate and are confined in said inner structure of said heat insulation layer.

2. A process as claimed in claim 1, wherein said liquid containing the ceramic particles of the passivating agent is impregnated into said heat insulation layer after which a heating step is carried out to vaporize the liquid leaving only the ceramic particles on the surfaces of the open inner structure of said heat insulation layer.

3. A process as claimed in claim 2, wherein said ceramic particles are ceramic oxide and said heating step is carried out at 500° C.

4. A process a claimed in claim 1, wherein said passivating, ceramic, nanocrystalline particles are selected from the group consisting of cerium oxide and zirconium oxide.

5. A process for producing a heat insulation, ceramic layer on a metal structural part, comprising:

depositing a material containing zirconium oxide onto a metal structural part to form a heat insulation layer on said metal part, said heat insulation layer having an open, inner structure impregnating said heat insulation layer with a liquid containing a passivating agent of platinum to form a passivating platinum coating on surfaces of said open, inner structure of said heat insulation layer, and heat treating said insulation layer and the metal structural part.

6. A process as claimed in claim 5, wherein after said liquid containing the passivating platinum agent is impregnated into said heat insulation layer, a heating step is carried out to leave pure platinum on said surfaces of said inner structure of said heat insulation layer.

7. A process as claimed in claim 6, wherein said heating step is carried out at 500° C.

8. A process as claimed in claim 5, comprising applying said metal to impregnate said heat insulation layer as an aqueous or organic solution of platinum.

9. A process as claimed in claim 5, comprising applying said metal to impregnate said heat insulation layer electrolytically by cathodic reduction.

10. A process as claimed in claim 9, comprising controlling deposition of the platinum to a region of the heat insulation layer proximate an interface between the heat insulation layer and the metal structural part by controlling time of electrolysis.

\* \* \* \* \*